(12) United States Patent
Marshall et al.

(10) Patent No.: US 11,750,480 B2
(45) Date of Patent: Sep. 5, 2023

(54) AGENT FOR AGGREGATION OF TELEMETRY FLOW DATA

(71) Applicant: Juniper Networks, Inc., Sunnyvale, CA (US)

(72) Inventors: Jeffrey S. Marshall, Santa Clara, CA (US); Gurminder Singh, Union City, CA (US); Prasad Miriyala, San Jose, CA (US); Iqlas M. Ottamalika, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/456,105

(22) Filed: Nov. 22, 2021

(65) Prior Publication Data

US 2023/0164041 A1    May 25, 2023

(51) Int. Cl.
*H04L 43/026* (2022.01)
(52) U.S. Cl.
CPC .................... *H04L 43/026* (2013.01)
(58) Field of Classification Search
CPC ...................................................... H04L 43/026
See application file for complete search history.

(56) References Cited

U.S. PATENT DOCUMENTS

| | | | | |
|---|---|---|---|---|
| 8,589,537 B2* | 11/2013 | King | ............... | G06F 11/3495 709/224 |
| 10,547,521 B1* | 1/2020 | Roy | ............... | H04L 41/0895 |
| 2014/0201222 A1* | 7/2014 | C. N. | ............... | G06F 16/244 707/754 |
| 2015/0212869 A1* | 7/2015 | Chen | ............... | G06F 11/0706 714/38.1 |
| 2015/0288593 A1* | 10/2015 | Campbell | ............... | H04L 65/762 709/224 |

OTHER PUBLICATIONS

European Telecommunications Standards Institute (ESTI), "Merge All Comments of ENI-009 Data WI", European Telecommunications Standards Institute (ESTI), ISG ENI Experiential Networked Intelligence, Feb. 3, 2021, 30 pp.
Extended Search Report from counterpart European Application No. 22151510.9 dated Jun. 17, 2022, 11 pp.
Liu et al., "The Design of Multi-Metric Load Balancer for Kubernetes", 2020 International Conference on Inventive Computation Technologies (ICICT), IEEE, Feb. 2020, pp. 1114-1117.

* cited by examiner

*Primary Examiner* — James E Springer
*Assistant Examiner* — Patrick F Ngankam
(74) *Attorney, Agent, or Firm* — Shumaker & Sieffert, P.A.

(57) ABSTRACT

A method includes subscribing, by an agent, to telemetry flow data from each network device of a plurality of network devices and receiving, by the agent, a plurality of streams of telemetry flow data from the plurality of the network devices. Each of the plurality of streams corresponds to a different one of the plurality of network devices. The method further includes aggregating, by the agent, data from at least one stream of the plurality of streams of the telemetry flow data received over a period of time and, at the end of the period of time and/or when the data from the at least one stream exceeds a data threshold, sending, by the agent, the aggregated telemetry flow data to a network analyzer device.

16 Claims, 4 Drawing Sheets

AGENT FOR AGGREGATION OF TELEMETRY FLOW DATA

TECHNICAL FIELD

This disclosure relates to computer networks, and more particularly, to managing network devices.

BACKGROUND

Network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

In particular, user configuration of devices may be referred to as "intents." An intent-based networking system allows administrators describe the intended network/compute/storage state. User intents can be categorized as stateful intents (e.g., business policies) or stateless intents. Stateful intents may be resolved based on the current state of a network. Stateless intents may be fully declarative ways of describing an intended network/compute/storage state, without concern for a current network state.

Intents may be represented as intent data models, which may be modeled using a unified graph model. Intent data models may be represented as connected graphs, so that stateful intents can be implemented across business computing architecture. For example, data models may be represented using data structures such as, for example, connected graphs having vertices connected with has-edges and reference (ref) edges. Controller devices may model intent data models as a unified graph model. In this manner, stateful intents can be implemented across intent data models. When intents are modeled using a unified graph model, extending new intent support may extend the graph model and compilation logic.

In order to configure devices to perform the intents, a user (such as a network administrator) may write translation programs that translate high-level configuration instructions (e.g., instructions according to an intent data model, which may be expressed as a unified graph model) to low-level configuration instructions (e.g., instructions according to a device configuration model). As part of configuration service support, the user/administrator may provide the intent data model and a mapping between the intent data model to the device configuration model.

A sensor device may collect Internet protocol (IP) network traffic as the traffic enters and/or exits an interface and may output a telemetry packet based on the IP network traffic. By analyzing the data provided by the telemetry packet, the user (such as a network administrator) can determine telemetry flow data such as, the source and destination of network traffic, a class of service of the network traffic, and a cause of congestion of the network traffic. The user and/or a controller device may use an intent to modify the configuration of network devices using the telemetry flow data.

SUMMARY

In general, this disclosure describes techniques to aggregate telemetry flow data generated by network devices. Some network analyzer devices (e.g., a device configured to aggregate telemetry flow data for packets) may receive telemetry flow data from each network device, for example of a pod. However, systems that send telemetry flow data from each network device to a network analyzer may not scale well. For example, as the number of network devices increases, a processing burden on the network analyzer to process the telemetry flow data increases. Moreover, as the number of network devices increases, a storage burden on the network analyzer to store the telemetry flow data increases.

Rather than relying on telemetry flow data from each network device or from relatively small samples from each network device, and as described herein, a system may include a software agent or simply "agent" arranged to aggregate telemetry flow data from a set of network devices. For example, the agent may use a publish-subscribe model to subscribe to telemetry flow data from each of the network devices of the set of network devices. In this example, the agent may receive a set of streams of telemetry flow data from the set of network devices. The agent may aggregate telemetry flow data from at least one stream (e.g., one or two of more streams) of the set of streams of the telemetry flow data. In response to one or more of an end of a period of time for receiving the at least one stream or when the telemetry flow data exceeds a data threshold, the agent may send the aggregated telemetry flow data to a network analyzer device. In this way, a number of samples of telemetry flow data may be reduced, which may reduce a processing burden on the network analyzer and/or a bandwidth used to send the telemetry flow data. For instance, the agent may reduce 10,000 samples from telemetry flow data from network devices to 1-10 samples of aggregated telemetry flow data. Reducing the amount of telemetry flow data sent across a network to the network analyzer may be helpful in the case of a cloud-based network analyzer that is located remotely from the network devices, such as a Software as a Service (SaaS) network analyzer device. Moreover, reducing the number of samples of telemetry flow data may reduce a data storage burden on the network analyzer.

In one example, a method includes subscribing, by an agent, to telemetry flow data from each network device of a plurality of network devices. The method further includes receiving, by the agent, a plurality of streams of telemetry flow data from the plurality of the network devices. Each of the plurality of streams corresponds to a different one of the plurality of network devices. The method further includes aggregating, by the agent, data from at least one stream of the plurality of streams of the telemetry flow data received over a period of time. The method further includes, at the end of the period of time and/or when the data from the at least one stream exceeds a data threshold, sending, by the agent, the aggregated telemetry flow data to a network analyzer device.

In another example, a device includes processing circuitry and memory comprising instructions that, when executed, cause the processing circuitry to subscribe to telemetry flow data from each network device of a plurality of network devices and receive a plurality of streams of telemetry flow data from the plurality of the network devices. Each of the plurality of streams corresponds to a different one of the plurality of network devices. The instructions further cause the processing circuitry to aggregate data from at least one stream of the plurality of streams of the telemetry flow data received over a period of time. The instructions further cause the processing circuitry to, at the end of the period of time and/or when the data from the at least one stream exceeds a data threshold, send the aggregated telemetry flow data to a network analyzer device.

In one example, a non-transitory computer-readable storage medium comprising one or more instructions that cause processing circuitry to subscribe to telemetry flow data from each network device of a plurality of network devices and receive a plurality of streams of telemetry flow data from the plurality of the network devices. Each of the plurality of streams corresponds to a different one of the plurality of network devices. The instructions further cause the processing circuitry to aggregate data from at least one stream of the plurality of streams of the telemetry flow data received over a period of time. The instructions further cause the processing circuitry to, at the end of the period of time and/or when the data from the at least one stream exceeds a data threshold, send the aggregated telemetry flow data to a network analyzer device.

The details of one or more examples are set forth in the accompanying drawings and the description below. Other features, objects, and advantages will be apparent from the description and drawings, and from the claims.

BRIEF DESCRIPTION OF DRAWINGS

Like reference characters refer to like elements throughout the figures and description.

DETAILED DESCRIPTION

Figure 1:
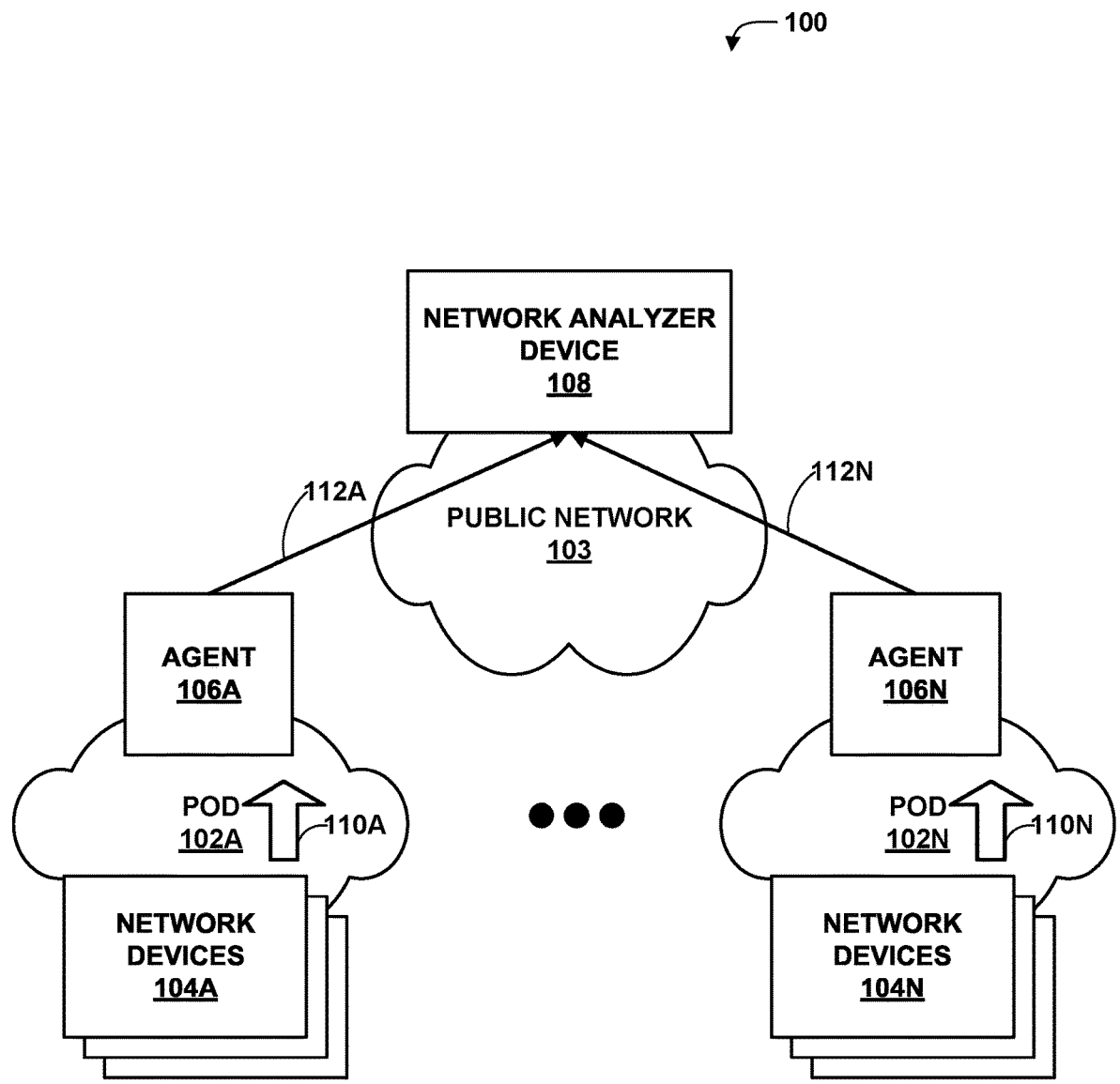
FIG. 1 is a block diagram illustrating an example system in which examples of the techniques described herein may be implemented.

FIG. 1 is a block diagram illustrating an example system 100 in which examples of the techniques described herein may be implemented. In general, network devices 104A-104N (collectively, "network devices 104") may be arranged into "pods." Each pod of pods 102A-102N (collectively, "pods 102") may represent a group of, for example, approximately 100 managed network devices. Network devices 104 may stream telemetry flow data to a network analyzer device 108, e.g., using a network flow collection protocol such as NetFlow or a packet sampling protocol such as sampled flow ("sFlow"). Network devices 104A may represent, for example, hundreds of devices or thousands of devices.

Network analyzer device 108 may be configured to receive telemetry flow data for network devices 104. In some examples, telemetry flow data output by network devices 104A may indicate a set of samples of a traffic flow of packets exchanged by network device 104A. For instance, the telemetry flow data may represent a set of samples of packets flowing from a source IP address to a destination IP address. Telemetry flow data may be compliant with NetFlow, other flow protocols may be used, such as, for example, sampled flow (sflow), Juniper flow (Jflow), or another flow protocol. Network analyzer device 108 may be configured to use the telemetry flow data to monitor traffic flow to provide visibility into the use of a network. For example, network analyzer device 108 may use the telemetry flow data to perform one or more of troubleshooting network problems, controlling congestion, perform a security and audit analysis, or perform route profiling.

Network devices 104 may include, for example, routers, switches, gateways, bridges, hubs, servers, firewalls or other intrusion detection systems (IDS) or intrusion prevention systems (IDP), computing devices, computing terminals, printers, other network devices, or a combination of such devices. Network devices 104 may include one or more sensor devices configured to generate a telemetry packet indicating telemetry flow data for a plurality of packets output by a respective network element. In some examples, each one of network devices 104 may be associated with a respective set of sensor devices that are separate (e.g., a separate circuit board or a separate processing device) from the network devices 104. While described in this disclosure as transmitting, conveying, or otherwise supporting packets, network devices 104 may transmit data according to any other discrete data unit defined by any other protocol, such as a cell defined by the Asynchronous Transfer Mode (ATM) protocol, or a datagram defined by the User Datagram Protocol (UDP). Communication links interconnecting network devices 104 may be physical links (e.g., optical, copper, and the like), wireless, or any combination thereof.

Network devices 104 may be connected to network analyzer device 108 via a public network 103 (e.g., the Internet). The public network may include, for example, one or more client computing devices. The public network may provide access to web servers, application servers, public databases, media servers, end-user devices, and other types of network resource devices and content. The public network may provide access to network analyzer device 108. Network analyzer device 108 may represent one or more computing devices (e.g., a server, a computer, or a cloud).

Pods 102 may each be a Kubernetes pod and an example of a virtual network endpoint. A pod is a group of one or more logically-related containers (not shown in FIG. 1), the shared storage for the containers, and options on how to run the containers. Where instantiated for execution, a pod may alternatively be referred to as a "pod replica." For example, each container of pod 102A may be an example of a virtual execution element. Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

In some cases, all pods in all namespaces that are spawned in the Kubernetes cluster may be able to communicate with one another, and the network addresses for all of the pods may be allocated from a pod subnet that is specified by the orchestrator 23. When a user creates an isolated namespace for a pod, orchestrator 23 and network controller 24 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network.

Software agents 106A-106N (collectively, "agents 106"), also referred to herein as simply "agents 106," may be configured to aggregate data from network devices 104. While the example of FIG. 1 illustrates agents 106A as being implemented in a pod, in some examples agents 106 may be implemented in a virtual machine and/or on a bare metal server, for example. Agents 106 may represent a compute nodes of pods 102. For example, agent 106A may be implemented as a compute node of pod 102A using processing circuitry and agent 106N may be implemented as a compute node of pod 102N using processing circuitry.

Agents 106 and network devices 104 may be physically remote from network analyzer device 108. In some examples, agents 106 may be located at a network edge of public network 103. Agents 106 may send aggregated telemetry flow data to network analyzer device 108 across public network 103 to network analyzer device 108.

In order to reduce network traffic sent over public network 103, each pod of pods 102 may include a respective agent of agents 106 configured to collect and aggregate telemetry flow data from the various managed network devices 104 of pod 120. For example, pod 102A may include an agent 106A may be configured to collect and aggregate telemetry flow data from the network devices 104A. That is, an agent (e.g., agent 106A) of a pod of pods 102 may be configured to subscribe to the telemetry flow data of each of the network devices of the pod. The software agent may then aggregate this data and push the aggregated data to a cloud-based collector at a regular interval, e.g., a thirty second interval. In particular, the aggregation may be of a plurality of distinct streams, e.g., originating from different network devices in the pod. For example, the software agent may mathematically combine values from different streams corresponding to a common characteristic. In some examples, the software agent may be further configured to perform analysis and/or synthesis on the aggregated data as well.

In the example of FIG. 1, agents 106 subscribe to a stream of telemetry flow data 110 (also referred to herein as simply, "telemetry flow data 110," from network devices 104. For instance, each of network devices 104A may send telemetry flow data 110 (e.g., sFlow data) as a sample once every interval (e.g., a 1 second interval). Agents 106 may aggregate telemetry flow data 110. For example, agent 106A may aggregate telemetry flow data 110 from a single stream.

In some examples, agent 106A may aggregate telemetry flow data 110 from two or more streams associated with a unique 5-tuple flow. For example, agent 106A may aggregate telemetry flow data 110 that comprises metadata indicating a frequently used 5-tuple (e.g., a source IP address, source TCP/UDP port, destination IP address, destination TCP/UDP port and IP protocol) for a period of time (e.g., 1 minutes, 15 minutes, or 1 hour) to generate aggregated data 112A. For instance, agent 106A may sum transmission rates and/or receiving rates from all of the samples (e.g., sFlow samples) of the telemetry flow data 110 that comprises the metadata indicating the common 5-tuple for the period of time.

Agents 106 may send the aggregated data 112A-112N (aggregated data 112) to network analyzer device 108. For example, agent 106A may send aggregated data 112A that indicates samples (e.g., sFlow samples) from telemetry flow data 110 that comprises the common 5-tuple that was received during the period of time. Network analyzer device 108 may use aggregated data 112 to analyze characteristics of system 100, e.g., to modify a configuration of network devices 104, to implement additional or alternative network services, to determine whether to add, remove, or modify network devices or links between the network devices, or other such decisions.

Aggregating data from two of more streams may help to reduce an amount of data transferred to network analyzer device 108, which may reduce a bandwidth usage within the public network 103 to network analyzer device 108. Moreover, aggregating data from two of more streams may help to reduce an amount of data to be processed by network analyzer device 108, which may reduce a processing resource burden of network analyzer device 108. For instance, agents 106 may reduce 10,000 samples to be streamed from network devices 104 to 1-10 samples for processing by network analyzer device 108. Further, aggregating data from two of more streams may help to reduce an amount of data to be stored by network analyzer device 108, thus reducing an amount of memory required. While the data could be aggregated at the network analyzer device 108 before being stored, the techniques of this disclosure employ multiple distributed agents 106 to perform aggregation at the network edge where the flow records are created, remote from the network analyzer device 108 (which may be cloud-based). This approach may provide benefits over aggregating the flow data at the network analyzer device 108, in that less data is sent over public network 103, and less data needs to be processed by the network analyzer device 108. Instead, the burden of aggregating flow data is handled by multiple distributed agents 106 at the network edge.

Figure 2:
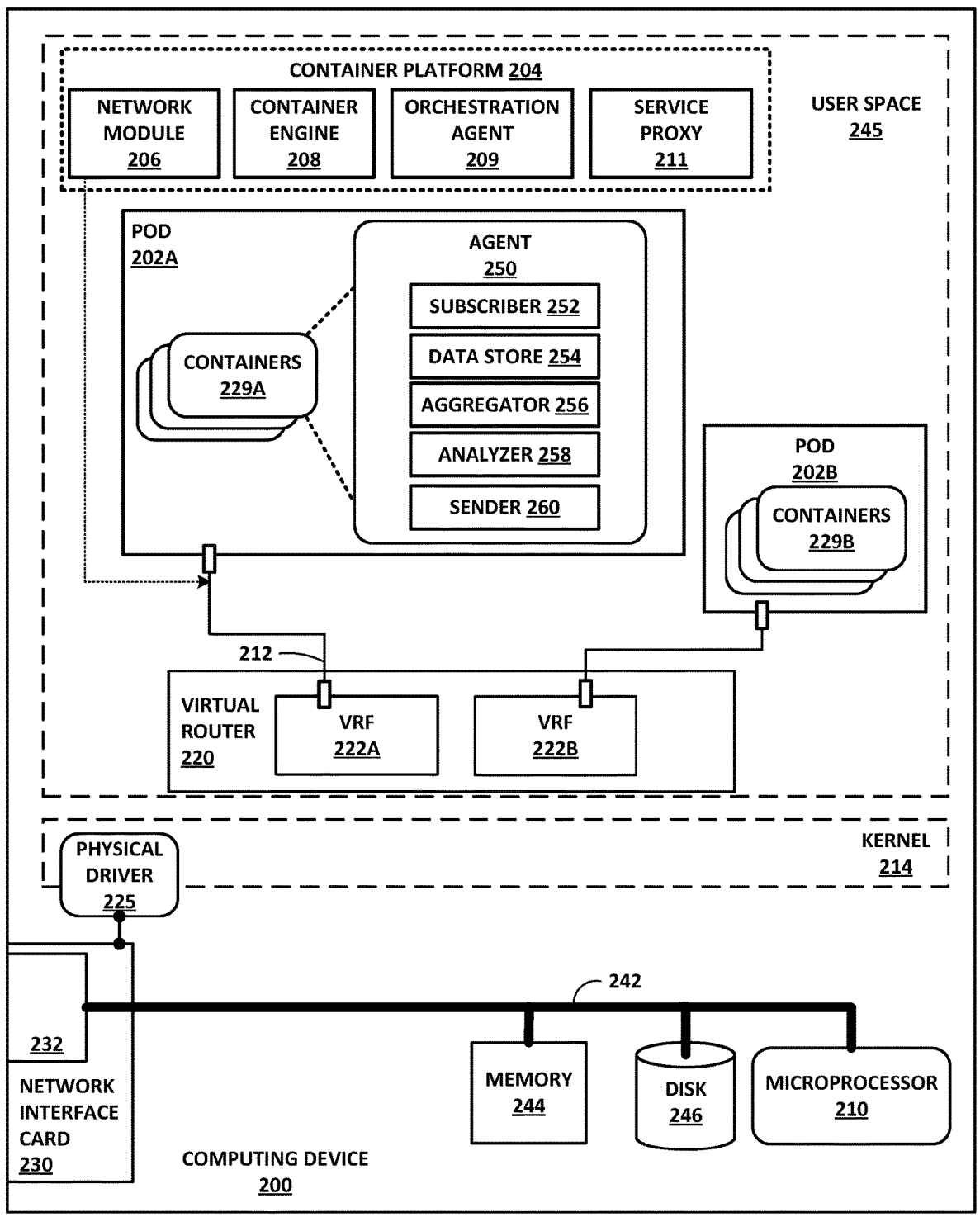
FIG. 2 is a block diagram of an example computing device (e.g., host) that includes a pod for implementing an agent configured to aggregate telemetry flow data from network devices, according to techniques described in this disclosure.

FIG. 2 is a block diagram of an example computing device (e.g., host) that includes a pod for implementing an agent configured to aggregate telemetry flow data from network devices, according to techniques described in this disclosure. Pods 202A-202B may represent example instances of pods 102 of FIG. 1, in further detail. Agents 106 of FIG. 1 may be implemented as containers 229A-229B. For example, one or more of containers 229A may implement agent 250.

Computing device 200 of FIG. 2 may represent a real or virtual server and may represent an example instance of any of servers 12 of FIG. 1. Computing device 200 includes in this example, a bus 242 coupling hardware components of a computing device 200 hardware environment. Bus 242 couples network interface card (NIC) 230, storage disk 246, and one or more microprocessors 210 (hereinafter, "microprocessor 210"). NIC 230 may be SR-IOV-capable. A frontside bus may in some cases couple microprocessor 210 and memory device 244. In some examples, bus 242 may couple memory device 244, microprocessor 210, and NIC 230. Bus 242 may represent a Peripheral Component Interface (PCI) express (PCIe) bus. In some examples, a direct memory access (DMA) controller may control DMA transfers among components coupled to bus 242. In some examples, components coupled to bus 242 control DMA transfers among components coupled to bus 242.

Microprocessor 210 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 244 provides a physical address space composed of addressable memory locations.

Network interface card (NIC) 230 includes one or more interfaces 232 configured to exchange packets using links of an underlying physical network. Interfaces 232 may include a port interface card having one or more network ports. NIC 230 may also include an on-card memory to, e.g., store packet data. Direct memory access transfers between the NIC 230 and other devices coupled to bus 242 may read/write from/to the NIC memory.

Memory 244, NIC 230, storage disk 246, and microprocessor 210 may provide an operating environment for a software stack that includes an operating system kernel 214 executing in kernel space. Kernel 214 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from Vmware, Windows Hyper-V available from Microsoft, and other open-source and proprietary hypervisors. The term hypervisor can encompass a virtual machine manager (VMM). An operating system that includes kernel 214 provides an execution environment for one or more processes in user space 245.

Kernel 214 includes a physical driver 225 to use the network interface card 230. Network interface card 230 may also implement SR-IOV to enable sharing the physical network function (I/O) among one or more virtual execution elements, such as containers 229A-229B or one or more virtual machines (not shown in FIG. 2). Shared virtual devices such as virtual functions may provide dedicated resources such that each of the virtual execution elements may access dedicated resources of NIC 230, which therefore appears to each of the virtual execution elements as a dedicated NIC. Virtual functions may represent lightweight PCIe functions that share physical resources with a physical function used by physical driver 225 and with other virtual functions. For an SR-IOV-capable NIC 230, NIC 230 may have thousands of available virtual functions according to the SR-IOV standard, but for I/O-intensive applications the number of configured virtual functions is typically much smaller.

Pods 202A-202B may represent example instances of pods 102 of FIG. 1, in further detail. Pod 202A includes one or more containers 229A, and pod 202B includes one or more containers 229B. Container platform 204 may represent an example instance of container platform 19A of FIG. 1, in further detail. Container platform 204 include container runtime 208, orchestration agent 209, service proxy 211, and network module 206. Network module 206 may represent an example instance of network module 17A of FIG. 1.

Container engine 208 includes code executable by microprocessor 210. Container runtime 208 may be one or more computer processes. Container engine 208 runs containerized applications in the form of containers 229A-229B. Container engine 208 may represent a Dockert, rkt, or other container engine for managing containers. In general, container engine 208 receives requests and manages objects such as images, containers, networks, and volumes. An image is a template with instructions for creating a container. A container is an executable instance of an image. Based on directives from controller agent 209, container engine 208 may obtain images and instantiate them as executable containers 229A-229B in pods 202A-202B.

Service proxy 211 includes code executable by microprocessor 210. Service proxy 211 may be one or more computer processes. Service proxy 211 monitors for the addition and removal of service and endpoints objects, and it maintains the network configuration of the computing device 200 to ensure communication among pods and containers, e.g., using services. Service proxy 211 may also manage iptables to capture traffic to a service's virtual IP address and port and redirect the traffic to the proxy port that proxies a backed pod. Service proxy 211 may represent a kube-proxy for a minion node of a Kubernetes cluster. In some examples, container platform 204 does not include a service proxy 211 or the service proxy 211 is disabled in favor of configuration of virtual router 220 and pods 202 by network modules 206.

Orchestration agent 209 includes code executable by microprocessor 210. Orchestration agent 209 may be one or more computer processes. Orchestration agent 209 may represent a kubelet for a minion node of a Kubernetes cluster. Orchestration agent 209 is an agent of an orchestrator, e.g., orchestrator 23 of FIG. 1, that receives container specification data for containers and ensures the containers execute by computing device 200. Container specification data may be in the form of a manifest file sent to orchestration agent 209 from orchestrator 23 or indirectly received via a command line interface, HTTP endpoint, or HTTP server. Container specification data may be a pod specification (e.g., a PodSpec—a YAML (Yet Another Markup Language) or JSON object that describes a pod) for one of pods 202 of containers 229. Based on the container specification data, orchestration agent 209 directs container engine 208 to obtain and instantiate the container images for containers 229, for execution of containers 229 by computing device 200.

Orchestration agent 209 instantiates network module 206 to configure one or more virtual network interfaces for each of pods 202. For example, orchestration agent 209 receives a container specification data for pod 202A and directs container engine 208 to create the pod 202A with containers 229A based on the container specification data for pod 202A. Orchestration agent 209 also invokes the network module 206 to configure, for pod 202A, virtual network interface 212 for a virtual network corresponding to VRFs 222A. In this example, pod 202A and pod 202B are virtual network endpoints for the virtual networks corresponding to VRF 222A and VRF 222B.

Container 229A may implement one or more software agents 106 of FIG. 1. For example, a software agent of container 229A may be configured to aggregate data from network devices 104 of FIG. 1. Container 229A is used the following examples for example purposes only.

In order to reduce network traffic sent over public network 103, pod 202A may include agent 250 implemented by container 229A and configured to collect and aggregate telemetry flow data from the various managed network devices of pod 202A. For example, agent 250 may be configured to collect and aggregate telemetry flow data from the network devices. Subscriber 252 may be configured to subscribe to the telemetry flow data of each of the network devices of pod 202A. For example, each of the network devices of pod 202A may be configured to send (e.g., using sFlow) telemetry data to an IP address corresponding to (e.g., matching) agent 250. In this way, each of the network devices of pod 202A may be configured to send telemetry data generated by the respective network devices to agent 250, which is treated as a collector device (e.g., in compliance with sFlow).

Agent 250 may store the telemetry flow data of each of the network devices of pod 202A at data store 254. Aggregator 256 may aggregate the telemetry flow data stored at data store 254. Sender 260 (e.g., a gRPC sender) may send the aggregated data to a cloud-based collector (e.g., a gRPC receiver) at a regular interval that may be configurable, e.g., a thirty second interval. In particular, the aggregation may be of a plurality of distinct streams, e.g., originating from different network devices in the pod or outside the pod. For example, aggregator 256 may aggregate telemetry flow data for a single stream across multiple time interval samples for a given time period. In some examples, aggregator 256 may mathematically combine values from different streams corresponding to a common characteristic among the streams. In some examples, container 229A may optionally include analyzer 258 that is configured to perform analysis and/or synthesis on the aggregated data as well.

At the end of the period of time and/or when the data from the at least one stream (e.g., one stream or two or more streams) exceeds a data threshold, sender 260 may send aggregated telemetry flow data to network analyzer device 108. For example, aggregator 256 may aggregate data from at least one stream of the plurality of streams of the telemetry flow data received over a period of time. However, if before the end of the period of time, sender 260 determines that the data from the at least one stream is greater than a data threshold, sender 260 may send the aggregated telemetry flow data in response to determining that the data from the at least one stream is greater than the data threshold. If at the end of the period of time, sender 260 determines that the data from the at least one stream is less than the data threshold, sender 260 may send the aggregated telemetry flow data in response to the end of the period of time.

An agent implemented by container 229A may output the aggregated telemetry flow data that includes metadata. For example, the agent may output the aggregated telemetry flow data that includes one or more of a tenant identifier associated with the telemetry flow data received from network devices 104 or a location identifier associated with the telemetry flow data received from network devices 104. For instance, agent 250 may establish a gRPC connection to a network analyzer device 108 (e.g., a SaaS controller). In this example, the gRPC connection with agent 250 to network analyzer device 108 may be per agent and agent 250 may identify a location identifier and/or a tenant identifier using the gRPC connection.

In some examples, agent 250 may be configured to select between an aggregate flow mode and a debugging mode. For example, agent 250 may receive an instruction from network analyzer device 108 instructing the agent to operate in the aggregate flow mode. In this example, agent 250 may collect and aggregate telemetry flow data from the various managed network devices of pod 202A and "roll-up" the aggregated telemetry flow data to network analyzer device 108. For example, agent 250 may performing one or more of subscribing to telemetry flow data, receiving streams of telemetry flow data, aggregating data from at least one stream of the telemetry flow data, and sending the aggregated flow data in response to receiving an instruction to operate in an aggregate flow mode.

In contrast, in response to receiving an instruction from network analyzer device 108 instructing agent 250 to operate in the debugging mode, agent 250 (e.g., subscriber 2542) may collect the telemetry flow data from the various managed network devices of pod 202A and forward all of the data without aggregation and without delay. For instance, agent 250 may receive a telemetry packet from a network device of network devices 104A and may forward the telemetry packet from the network device without first collecting telemetry packets for a period of time. For example, in response to receiving an instruction to operate in a debugging mode, agent 250 may send subsequently received streams of telemetry flow data from network devices 104 to network analyzer device 108 without aggregating, before the end of a configured time period, and before the data exceeds the data threshold. The period of time, configuration time period, and/or memory threshold may be configurable, for example, by an administrator.

In some examples, aggregator 256 may be configured to correlate and/or enrich telemetry data of "mixed" types. For example, analyzer 258 may correlate across data from different vendor devices and/or supporting different protocols (e.g., a router using NetFlow, a router using Jflow, or a bare metal server using another flow protocol). For instance, when analyzer 258 receives telemetry flow data from network devices, the telemetry flow data may be in different formats. In this instance, analyzer 258 may normalize the telemetry flow data in different formats into a common format. For instance, analyzer 258 may convert telemetry flow data in different formats that are from different types of sources (e.g., sFlow, Jflow . . . ) into telemetry flow data of a common format for storage.

Aggregator 256 may enrich telemetry data of mixed types with the same identifier, for example. For instance, aggregator 256 may correlate a first stream of two or more streams compliant with a first protocol with a second stream of the two or more streams compliant with a second protocol using an identifier. The first protocol and the second protocol may be different.

Sender 260 may be more secure by sending aggregated flow data across public network 103 compared to sending raw telemetry flow data itself, because if intercepted the data being sent may have less visibility into the actual data of a specific network device. For example, sender 260 may provide a reliable and secure backhaul of information flow from the customer premises to the cloud. For instance, network devices 104A may send flow data via unencrypted UDP-based packets and sender 260 may aggregated flow packets using gRPC, which may be more suitable (e.g., more secure and/or more reliable) for transferring data to the cloud (e.g., network analyzer device 108) than unencrypted UDP-based packets. Analyzer 258 may generate a snapshot of data (e.g., a 15 minute portion of telemetry flow data) to a user to help to ensure telemetry flow data provided to network analyzer device 108 is accurate.

Figure 3:
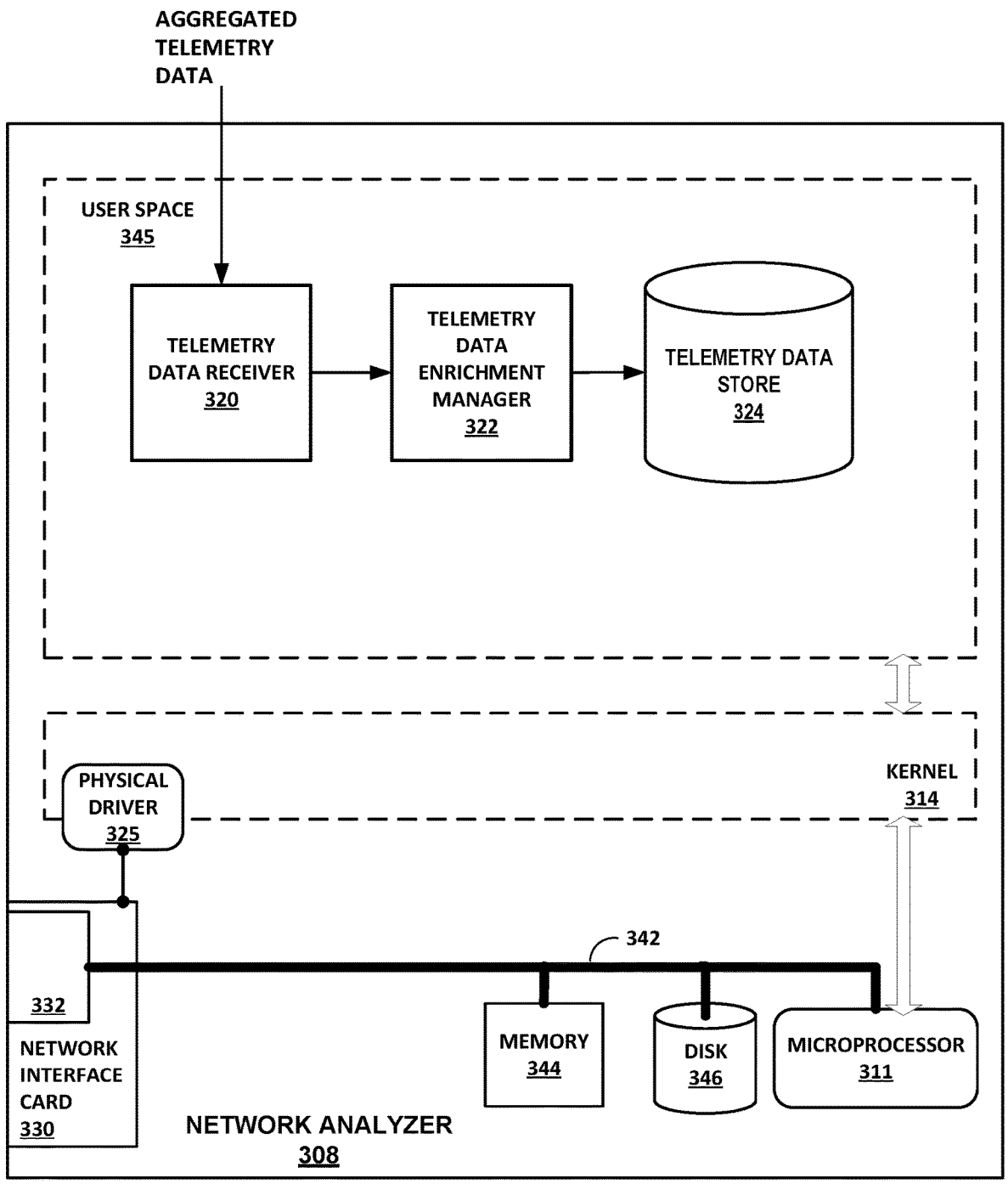
FIG. 3 is a block diagram of an example computing device operating as an instance of a network analyzer, according to techniques described in this disclosure.

FIG. 3 is a block diagram of an example computing device operating as an instance of a network analyzer, according to techniques described in this disclosure. Computing device 300 an example instance of controller 5 for a virtualized computing infrastructure. Computing device 300 of FIG. 3 may represent one or more real or virtual servers.

Telemetry flow data receiver 320, telemetry flow data enrichment manager 322, and telemetry flow data store 324, although illustrated and described as being executed by a single computing device 300, may be distributed among multiple computing devices 300 that make up a computing system or hardware/server cluster. Each of the multiple computing devices 300, in other words, may provide a hardware operating environment for one or more instances of any one or more of telemetry flow data receiver 320, telemetry flow data enrichment manager 322, and telemetry flow data store 324.

Telemetry flow data receiver 320 may be configured to receive aggregated telemetry flow data from agents 106 of FIG. 1. For example, telemetry flow data receiver 320 may comprise a gRPC remote procedure call (gRPC) edge receiver configured to receive the aggregated telemetry flow data from a gRPC edge sender of agents 106. In some examples, telemetry flow data receiver 320 may be configured to receive telemetry flow data directly from network devices 104. For example, data receiver 320 may be configured to receive one or more telemetry packets indicating aggregated telemetry flow data from agents 106 of FIG. 1. Telemetry packets may be compliant with, for example, NetFlow, OpenConfig, Juniper Telemetry Interface (JTI) Native, netconf, Simple Network Management Protocol (SNMP), syslog, and sFlow. Aggregated telemetry flow data may have an associated transmission rate and/or a receiving rate. Aggregated telemetry flow data may include metadata indicating a tuple (e.g., a 5-tuple or a 3-tuple) associated with the aggregated telemetry flow data. In some examples, the metadata included in aggregated telemetry flow data may include one or more of a tenant identifier or a location identifier.

Telemetry flow data enrichment manager 322 may be configured to convert the aggregated telemetry flow data to a system format for network analyzer 308. For example, telemetry flow data enrichment manager 322 may convert sflow UDP datagrams to protocol buffers (protobufs) for processing by Kafka. Telemetry flow data enrichment manager 322 may convert the protobufs to an SQL format for storage at telemetry flow data store 324. For instance, telemetry flow data enrichment manager 322 may be configured to convert a device identifier indicated in the aggregated telemetry flow data into a network device identifier. Telemetry flow data enrichment manager 322 may be configured to correlate aggregated telemetry flow data to a server (e.g., VMware or a hypervisor). Telemetry flow data enrichment manager 322 may maintain aggregated telemetry flow data for one or more of network devices, server collection, instance collection, network device to bare metal server (BMS) connections, or a project list. Telemetry flow data enrichment manager 322 may be configured to store the converted aggregated telemetry flow data in telemetry flow data store 324.

In accordance with the techniques of the disclosure, agents 106 may aggregate data from at least one stream (e.g., one stream or two or more streams) of the plurality of streams of the telemetry flow data received over a period of time. Aggregating data from two of more streams may help to reduce an amount of data transferred to network analyzer 308, which may reduce a bandwidth usage of the network over which streams are sent to network analyzer 308. Moreover, aggregating data from two of more streams may help to reduce an amount of data to be processed by network analyzer 308, which may reduce a processing burden of network analyzer 308. For instance, agents 106 may reduce 10,000 samples to be streamed from network devices 104 to 1-10 samples for processing by network analyzer 308. Further, aggregating data from two of more streams may help to reduce an amount of data to be stored by telemetry flow data store 324 of network analyzer 308.

Computing device 300 includes in this example, a bus 342 coupling hardware components of a computing device 300 hardware environment. Bus 342 couples network interface card (NIC) 330, storage disk 346, and one or more microprocessors 310 (hereinafter, "microprocessor 310"). A frontside bus may in some cases couple microprocessor 310 and memory device 344. In some examples, bus 342 may couple memory device 344, microprocessor 310, and NIC 330. Bus 342 may represent a Peripheral Component Interface (PCI) express (PCIe) bus. In some examples, a direct memory access (DMA) controller may control DMA transfers among components coupled to bus 242. In some examples, components coupled to bus 342 control DMA transfers among components coupled to bus 342.

Microprocessor 310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 310.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory.

Memory 344, NIC 330, storage disk 346, and microprocessor 310 may provide an operating environment for a software stack that includes an operating system kernel 314 executing in kernel space. Kernel 314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (WM). An operating system that includes kernel 314 provides an execution environment for one or more processes in user space 345. Kernel 314 includes a physical driver 325 to use the network interface card 230.

Computing device 300 may be coupled to a physical network switch fabric that includes an overlay network that extends switch fabric from physical switches to software or "virtual" routers of physical servers coupled to the switch fabric, such virtual router 220 of FIG. 2. Computing device 300 may use one or more dedicated virtual networks to configure minion nodes of a cluster.

Various components, functional units, and/or modules illustrated in FIGS. 1-3 and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

Figure 4:
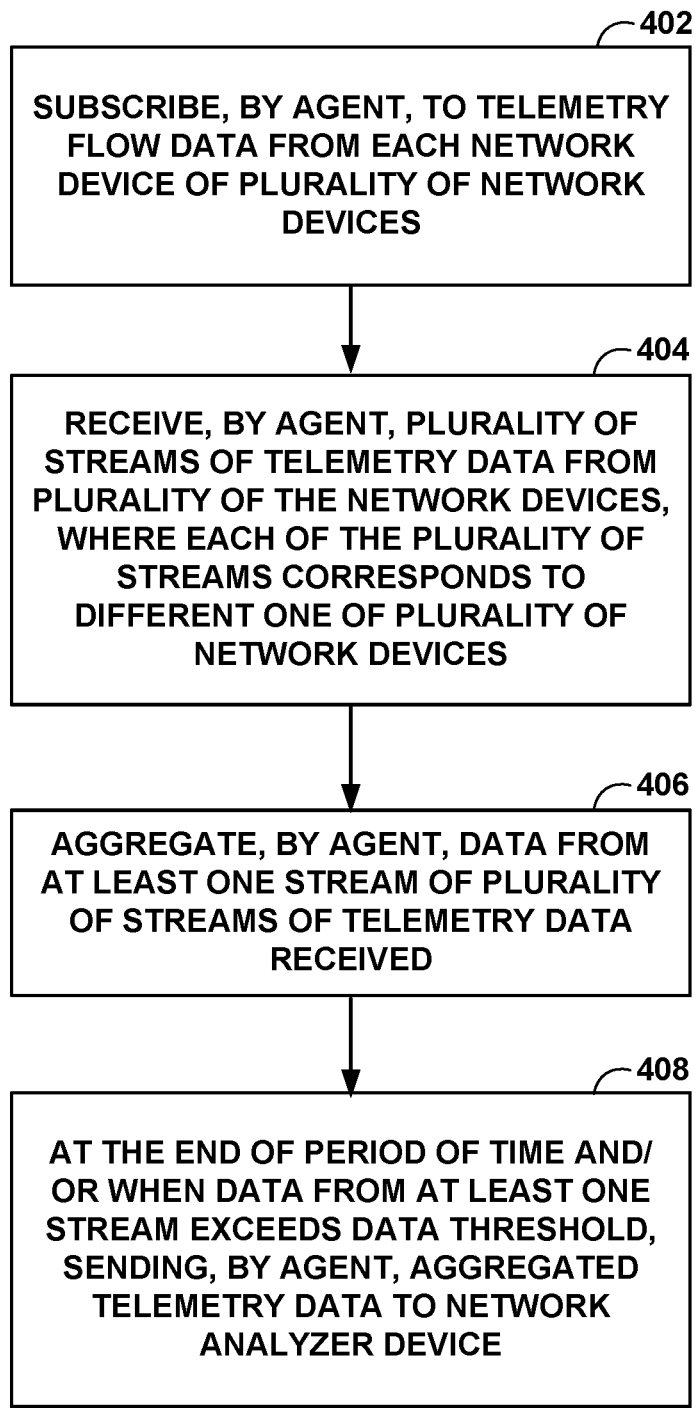
FIG. 4 is a flow diagram illustrating an example of aggregation of telemetry flow data, according to techniques described in this disclosure.

FIG. 4 is a flow diagram illustrating an example of aggregation of telemetry flow data, according to techniques described in this disclosure. FIG. 4 is described with reference to FIGS. 1-3 for example purposes only.

In the example of FIG. 4, agents 106 subscribe to telemetry flow data 110 (e.g., sFlow data) from network devices 104 (402). For example, agents 106 may subscribe to receive a stream of telemetry flow data 110. The telemetry stream may comprise a telemetry packet that is compliant with NetFlow, OpenConfig, Juniper Telemetry Interface (JTI) Native, netconf, SNMP, syslog, or sFlow.

Agents 106 receive a plurality of streams of telemetry flow data from a plurality of network devices 104 (404). Each of the plurality of streams may correspond to a different one of network devices 104. For example, agent 106A may receive a first steam of telemetry flow data from a first network device of network devices 104A, a second steam of telemetry flow data from a second network device of network devices 104A, and so on. For instance, each of network devices 104A may send telemetry flow data 110 (e.g., an sFlow packet) to comprise a set of samples once every interval (e.g., a 1 second interval).

Agents 106 aggregate telemetry flow data 110 from at least one stream (e.g., one stream or two or more streams) of the plurality of streams of the telemetry flow data received over a period of time (406). The period of time may be configurable, for example, by an administrator. For example, agents 106 may aggregate telemetry flow data from a single stream. In some examples, agents 106 may aggregate telemetry flow data for two or more streams based on a 5-tuple (source IP address, source TCP/UDP port, destination IP address, destination TCP/UDP port and IP protocol) or a 3-tuple (source IP address, destination IP address, IP protocol). For instance, agent 106A may sum transmission rates and/or receiving rates from all of the samples of the telemetry flow data 110 that comprises the metadata indicating the common 5-tuple for the period of time.

For example, agent 106A may determine that a second stream of telemetry flow data comprises a destination IP address that matches a destination IP address of a first stream of the telemetry flow data and a source IP address that matches a source IP address of the first stream. In this example, agent 106A may aggregated the first stream and the second stream based on a determination that the second stream comprises the destination IP address that matches the destination IP address of the first stream and the source IP address that matches the source IP address of the first stream. Agent 106 may determine that the second stream of telemetry flow data is associated with an IP protocol that matches an IP protocol of the first stream. In this example, agent 106A may aggregate the first stream and the second stream further based on determining that the second stream of telemetry flow data is associated with the IP protocol that matches the IP protocol of the first stream.

In some examples, agent 106A may determine that the second stream of telemetry flow data is assigned a destination port that matches a destination port of the first stream and determine that the second stream of telemetry flow data is assigned a source port that matches a source port of the first stream. In this example, agent 106A may aggregate the first stream and the second stream further based on determining that the second stream of telemetry flow data is assigned the destination port that matches the destination port of the first stream and on determining that the second stream of telemetry flow data is assigned the source port that matches the source port of the first stream.

Agents 106, at the end of the period of time and/or when the data from the at least one stream (e.g., one stream or two or more streams) exceeds a data threshold, send the aggregated telemetry flow data to network analyzer device 108 (408). For example, at the end of a period of time, agent 106A may determine that the data from the at least one stream is less than the data threshold. The data threshold may be configurable, for example, by an administrator. In this example, agent 106A may send the aggregated telemetry flow data in response to the end of the period of time. For instance, agent 106A may generate an sFlow packet that comprise each respective set of samples for each sFlow packet received from network devices 104. In some examples, before the end of the period of time, agent 106A may determine that the data from the at least one stream is greater than the data threshold. In this example, agent 106A may send the aggregated telemetry flow data in response to determining that the data from the at least one stream is greater than the data threshold.

Network analyzer device 108 may use aggregated data 112 to analyze characteristics of system 100, e.g., to modify configuration of network devices 104, to implement additional or alternative network services, to determine whether to add, remove, or modify network devices or links between the network devices, or other such decisions.

In some examples, agent 106A may be configured to select between an aggregate flow mode and a debugging mode. For example, agent 106A may receive an instruction from network analyzer device 108 instructing the agent to operate in the aggregate flow mode. In this example, agent 106A may collect and aggregate telemetry flow data from network devices 104A and "roll-up" the aggregated telemetry flow data to network analyzer device 108. In response, however, to receiving an instruction from network analyzer device 108 instructing agent 106A to operate in the debugging mode, agent 106A may collect the telemetry flow data from network devices 104A and forward the data without aggregation and without delay. For instance, agent 106A may receive a telemetry packet from a network device of network devices 104A and may forward the telemetry packet from the network device to network analyzer device 108 without collecting telemetry packets for a period of time.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A method comprising:
    subscribing, by an agent, to receive telemetry flow data from each network device of a plurality of network devices;
    receiving, by the agent and based on the subscribing, a plurality of streams of telemetry flow data from the plurality of the network devices, wherein each of the plurality of streams corresponds to a different one of the plurality of network devices;
    aggregating, by the agent, telemetry flow data from at least one stream of the plurality of streams of the telemetry flow data received over a portion of a period of time, wherein the aggregated telemetry flow data indicates one or more of a transmission rate of the at least one stream during the portion of the period of time or a receiving rate of the at least one stream during the portion of the period of time;
    before the end of the period of time, determining, by the agent, that an amount of aggregated telemetry flow data from the at least one stream satisfies a data threshold amount; and
    in response to determining that the amount of aggregated telemetry flow data from the at least one stream satisfies the data threshold amount, refraining from aggregating data from the at least one stream over a remaining portion of the period of time with the aggregated telemetry flow data and sending, by the agent, to a network analyzer device, the aggregated telemetry flow data for the portion of period of time.

2. The method of claim 1, wherein aggregating the telemetry flow data from the at least one stream comprises aggregating telemetry flow data from a single stream.

3. The method of claim 1, wherein aggregating the telemetry flow data from the at least one stream comprises aggregating telemetry flow data from two or more streams associated with a unique 5-tuple flow.

4. The method of claim 1, wherein the agent and the network devices are physically remote from the network analyzer device and located at a network edge of a public network, and wherein sending the aggregated telemetry flow data to the network analyzer device comprises sending the aggregated telemetry flow data across the public network to the network analyzer device.

5. The method of claim 1, wherein aggregating the telemetry flow data is in response to receiving an instruction to operate in an aggregate flow mode.

6. The method of claim 1, further comprising, in response to receiving an instruction to operate in a debugging mode, sending, by the agent, subsequently received streams of telemetry flow data from the plurality of network devices to the network analyzer device without aggregating, before the end of a configured time period, and before the data exceeds the data threshold amount.

7. The method of claim 1, further comprising:
determining, by the agent, that a second stream of telemetry flow data comprises a destination IP address that matches a destination IP address of a first stream of the telemetry flow data and a source IP address that matches a source IP address of the first stream; and
wherein aggregating the telemetry flow data from the at least one stream comprises aggregating the first stream and the second stream based on determining that the second stream comprises the destination IP address that matches the destination IP address of the first stream and the source IP address that matches the source IP address of the first stream.

8. The method of claim 7, further comprising:
determining, by the agent, that the second stream of telemetry flow data is associated with an IP protocol that matches an IP protocol of the first stream; and
wherein aggregating the telemetry flow data from the at least one stream comprises aggregating the first stream and the second stream further based on determining that the second stream of telemetry flow data is associated with the IP protocol that matches the IP protocol of the first stream.

9. The method of claim 7, further comprising:
determining, by the agent, that the second stream of telemetry flow data is assigned a destination port that matches a destination port of the first stream;
determining, by the agent, that the second stream of telemetry flow data is assigned a source port that matches a source port of the first stream; and
wherein aggregating the telemetry flow data from the at least one stream comprises aggregating the first stream and the second stream further based on determining that the second stream of telemetry flow data is assigned the destination port that matches the destination port of the first stream and on determining that the second stream of telemetry flow data is assigned the source port that matches the source port of the first stream.

10. The method of claim 1, wherein sending the aggregated telemetry flow data comprises sending a telemetry packet that is compliant with a protocol selected from a group consisting of NetFlow, OpenConfig, Juniper Telemetry Interface (JTI) Native, netconf, Simple Network Management Protocol (SNMP), syslog, and sFlow.

11. The method of claim 1, wherein aggregating the telemetry flow data from the at least one stream of the plurality of streams of the telemetry flow data comprises correlating a first stream of the at least one stream compliant with a first protocol with a second stream of the at least one stream compliant with a second protocol using an identifier.

12. A device comprising:
processing circuitry; and
memory comprising instructions that, when executed, cause the processing circuitry to:
subscribe to receive telemetry flow data from each network device of a plurality of network devices;
receive, based on the subscribing, a plurality of streams of telemetry flow data from the plurality of the network devices, wherein each of the plurality of streams corresponds to a different one of the plurality of network devices;
aggregate telemetry flow data from at least one stream of the plurality of streams of the telemetry flow data received over a portion of a period of time, wherein the aggregated telemetry flow data indicates one or more of a transmission rate of the at least one stream during the portion of the period of time or a receiving rate of the at least one stream during the portion of the period of time;
before the end of the period of time, determine that an amount of aggregated telemetry flow data from the at least one stream satisfies a data threshold amount; and
in response to the determination that the amount of aggregated telemetry flow data from the at least one stream satisfies the data threshold amount, refrain from aggregating data from the at least one stream over a remaining portion of the period of time with the aggregated telemetry flow data and send, to a network analyzer device, the aggregated telemetry flow data for the portion of period of time.

13. The device of claim 12, wherein the device and the network devices are physically remote from the network analyzer device and located at a network edge of a public network, and wherein, to send the aggregated telemetry flow data to the network analyzer device, the instructions cause the processing circuitry to send the aggregated telemetry flow data across the public network to the network analyzer device.

14. The device of claim 12, wherein the instructions further cause the processing circuitry to aggregate the telemetry flow data in response to receiving an instruction to operate in an aggregate flow mode.

15. The device of claim 12, wherein the instructions further cause the processing circuitry to, in response to receiving an instruction to operate in a debugging mode, send subsequently received streams of telemetry flow data from the plurality of network devices to the network analyzer device without aggregating, before the end of a configured time period, and before the data exceeds the data threshold amount.

16. A non-transitory computer-readable storage medium comprising one or more instructions that cause processing circuitry to:

subscribe to receive telemetry flow data from each network device of a plurality of network devices;

receive, based on the subscribing, a plurality of streams of telemetry flow data from the plurality of the network devices, wherein each of the plurality of streams corresponds to a different one of the plurality of network devices;

aggregate telemetry flow data from at least one stream of the plurality of streams of the telemetry flow data received over a portion of a period of time, wherein the aggregated telemetry flow data indicates one or more of a transmission rate of the at least one stream during the portion of the period of time or a receiving rate of the at least one stream during the portion of the period of time;

before the end of the period of time, determine that an amount of aggregated telemetry flow data from the at least one stream satisfies a data threshold amount; and in response to the determination that the amount of aggregated telemetry flow data from the at least one stream satisfies the data threshold amount, refrain from aggregating data from the at least one stream over a remaining portion of the period of time with the aggregated telemetry flow data and send, to a network analyzer device, the aggregated telemetry flow data for the portion of period of time.

\* \* \* \* \*